(12) United States Patent
Seo

(10) Patent No.: US 6,297,954 B1
(45) Date of Patent: *Oct. 2, 2001

(54) PERIPHERAL MOUNTING SYSTEM FOR A COMPUTER SYSTEM

(75) Inventor: Dong-Ki Seo, Suwon (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,409

(22) Filed: Aug. 27, 1998

(30) Foreign Application Priority Data

Aug. 28, 1997 (KR) .................................................. 97-42209

(51) Int. Cl.⁷ ........................................................ G06F 1/16
(52) U.S. Cl. .......................... 361/686; 361/683; 361/684; 361/685; 361/686; 361/394; 361/424
(58) Field of Search ................................... 361/683–686, 361/394, 424

(56) References Cited

U.S. PATENT DOCUMENTS

| 5,123,721 | 6/1992 | Seo . |
| 5,136,466 | 8/1992 | Remise et al. . |
| 5,142,447 | * 8/1992 | Cooke et al. .................. 361/394 |
| 5,319,519 | 6/1994 | Sheppard et al. . |
| 5,680,293 | 10/1997 | McAnally et al. . |

* cited by examiner

*Primary Examiner*—Leo P. Picard
*Assistant Examiner*—Yean-Hsi Chang
(74) *Attorney, Agent, or Firm*—Robert E. Bushnell, Esq.

(57) ABSTRACT

A brace device can be inserted between the two lateral sides of the peripheral device and the lateral sides of the bay in a computer chassis. The brace device physically connects to the peripheral device to hold it in position and also exerts a compressive force to further secure the peripheral device in position. The brace device may be constructed using a first bracket and a second bracket, that is slidably engageable with the first bracket. The second bracket has a bowed elastic portion on a side opposite to the first bracket. The brace device is inserted in a slot in the side of the bay in the chassis to secure a peripheral device within the bay.

19 Claims, 9 Drawing Sheets

PERIPHERAL MOUNTING SYSTEM FOR A COMPUTER SYSTEM

CLAIM OF PRIORITY

This application makes reference to, incorporates the same herein, and claims all rights accruing thereto under 35 U.S.C. §119 through my patent application entitled Computer System earlier filed in the Korean Industrial Property Office on the Aug. 28, 1997, and there duly assigned Ser. No. 1997/42209.

BACKGROUND OF THE INVENTION

1. Field of the Invention

The present invention relates, in general, to a computer system and, more particularly, to a computer system capable of easily seating auxiliary equipment, such as a floppy disc drive, a CD-ROM drive or a hard disc drive, in the bay of a chassis without using any separate fixing means, such as set screws.

2. Background Art

The development of an information-oriented society has resulted in increasing reliance by society on computer systems to collect and analyze data. This increasing reliance on computer systems has led to the continuous improvement of the hardware used with computer systems and to the further development of multi-functional computer systems.

One technique used to increase the usefulness of computers has been the use of removable hard disk drives. An advantage of removable hard disk drives is that larger amounts of data can be transferred from one computer system to another. The technology used for removable disk drives is also useful for more permanently attached drives, such as floppy disk drives or compact disk read only memory drives.

One method of attaching disk drives or other peripherals to a computer chassis is to attach braces onto each side of the peripheral using fasteners. Typically these braces have elastic portions or projections on the side that result in a firm fit between the peripheral and the bay in the computer housing. In addition, the side braces may have an additional elastic member contacting the side of the peripheral device for use in the case of failure of one of the fasteners. One example of this method is shown in U.S. Pat. No. 5,136,466 to Remise entitled Mounting Device for Detachably Mounting a Plurality of Computer Peripherals.

Another method of attaching peripherals to computer housings is to slide the peripheral, such as a hard disk drive, in through the front of the bay to secure the peripheral to the computer system. Some techniques for slidably mounting a peripheral device into a computer system are shown in U.S. Pat. No. 5,319,519 to Sheppard entitled Housing with Latch and Ejection Mechanism Air Portable Hard Disk Drive, and U.S. Pat. No. 5,123,721 to Seo entitled Device for Securing Peripheral Equipment of Computer.

The above described methods of attaching portable disk drives have the disadvantages of requiring fasteners to be inserted into the peripheral, and of requiring the peripherals in special housings to be compatible with the bracketing method. In addition, the design of the attachment mechanism is complicated, thus requiring more assembly time.

To eliminate some of the assembly time required to mount a peripheral into a computer system, fastenerless mounting systems have been developed. One fastenerless mounting system is shown in U.S. Pat. No. 5,680,293 to McAnally entitled Screwless Hard Disk Drive Mounting in a Computer System with a Chassis via a First Bracket Rigidly Mounted to the Chassis and a Second Bracket Movably Mounted to the Chassis. Mc Ally '293 mentions a bracket system that secures a hard disk drive to a dual leaf spring and bracket combination. The bracket requires that a user position a hard drive in a computer housing and then place a brace over one side of the hard drive.

The peripheral, or disk drive, mounting systems of the contemporary art do not provide a peripheral mounting system that allows a user to slide a peripheral into position, that is free from fasteners, and that does not require access to a side of the peripheral device for engaging the peripheral with the computer system. As such, I believe that it may be possible to improve on the prior art by providing a peripheral mounting system that allows a user to slide a peripheral into position, that is free from fasteners, that does require a large number of components, that is easy to install, that does not require access to a side of the peripheral device for engaging the peripheral with the computer system, that can be inserted and released through the front of the peripheral bay, and that is simpler for consumers to use.

SUMMARY OF THE INVENTION

Accordingly, it is an object of the present invention to provide an improved peripheral mounting system for a computer system.

It is another object to provide a peripheral mounting system for a computer system that allows a user to slide a peripheral into position inside of a computer system.

It is still another object to provide a peripheral mounting system for a computer system that is free from fasteners.

It is yet another object to provide a peripheral mounting system for a computer system that does not require a large number of components.

It is still yet another object to provide a peripheral mounting system for a computer system that is easy to install.

It is a further object to provide a peripheral mounting system for a computer system that does not require access to a side of the peripheral device to secure the peripheral inside of the computer system.

It is a further object still to provide a peripheral mounting system for a computer system that can be inserted and released through the front of a peripheral bay.

It is still yet a further object to provide a peripheral mounting system for a computer system that is simpler for consumers to use.

To accomplish these and other objects, a peripheral mounting device is provided that uses a pair of brace devices to secure a peripheral device to a computer chassis. A bay, or recess, is positioned in said chassis to receive the peripheral device. The peripheral device has a multitude of hollows in the peripheral body to allow plugs to physically engage the peripheral device. A brace device is inserted between the two lateral sides of the peripheral device and the lateral sides of the bay. The brace devices physically connect to the peripheral device to hold it in position and exert a compressive force to further secure the peripheral in position. The brace device may be constructed using a first bracket and a second bracket, that is slidably engageable with the first bracket. The second bracket has a bowed elastic portion on a side opposite to the first bracket. The brace device is inserted into a slot in the side of the bay in the chassis to secure a peripheral device within the bay. The second bracket has a latch attached at one end to allow a user to manually compress the elastic portion of the second bracket. To insert the peripheral into the bay, a user manipulates the latch to compress the elastic portion and move the brace device closer to the lateral side of the bay. This allows the peripheral device to fit inside the bay because, in compressing the elastic portion, the user has moved the plugs out of the way of the peripheral body. After the peripheral device is in place, the user releases the latch and the bracket device moves into physical contact with the peripheral. At the same time, the plugs on the side of the first bracket that face into the bay make physical contact with the peripheral device. Thus, the peripheral device is secured by plugs that are inserted into hollows in the peripheral body and by the frictional force generated by the compressive force resulting from the elastic portion of the second bracket.

In addition, the second bracket has a multitude of prongs that have elastic characteristics. These prongs engage the first bracket and maintain the proper amount of space between the two brackets. The prongs are inserted into holes in the first bracket that secure the prongs in position.

Furthermore, the plugs used with the first bracket may be integrally ormed with the first bracket or they may be welded or removably inserted into the bores that exist along the first bracket. The bores may be constructed with inner threads making it possible to fasten the plugs into position if they have a circular cross section. The ends of the plugs can be designed to have a slot of a predetermined size in them.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
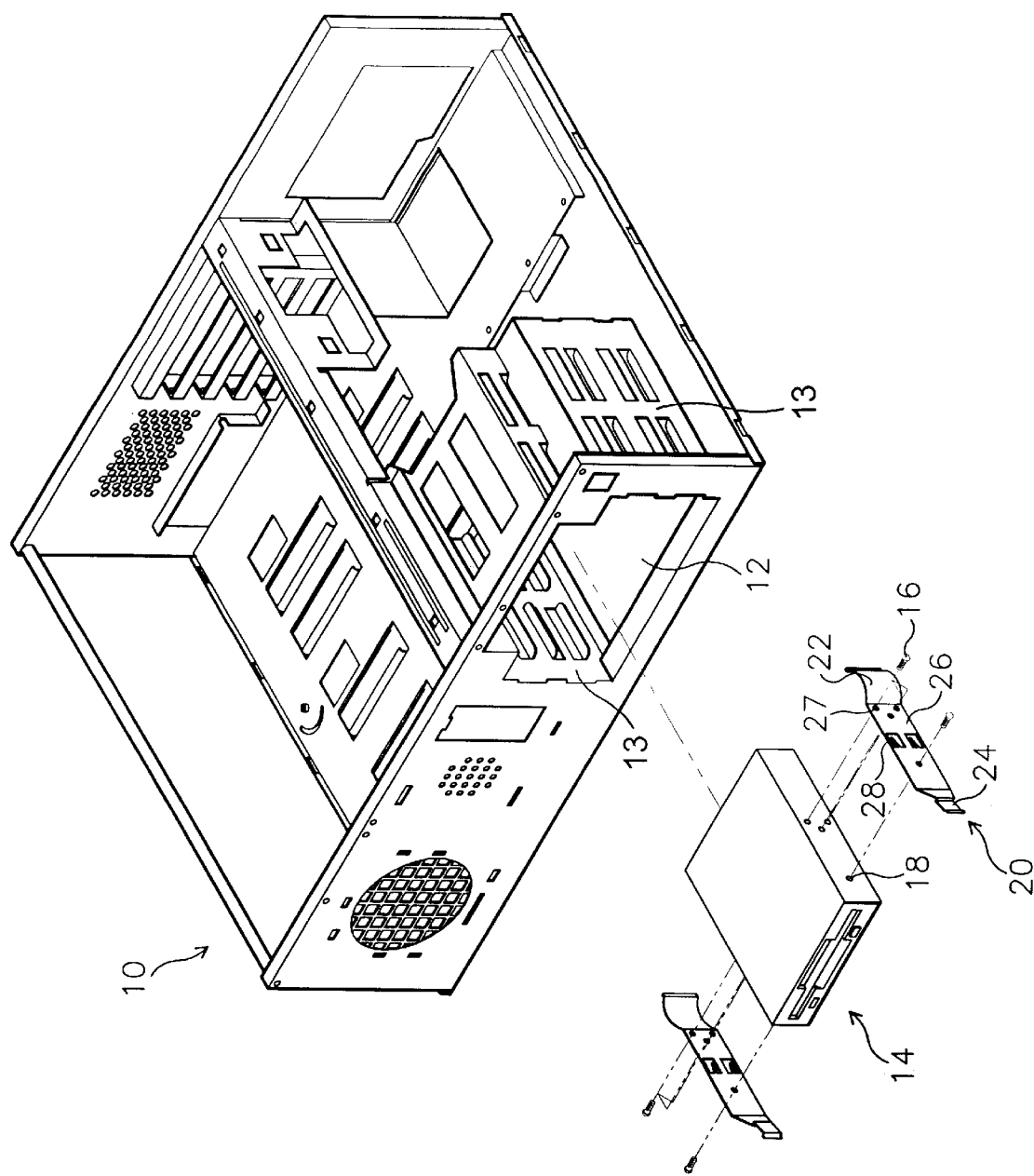
FIG. 1 is an exploded perspective view of the chassis of a computer housing and a peripheral device that will be mounted in the chassis of the computer by fastening brackets having one bowed elastic portion to each lateral side of the peripheral so that the brackets support the peripheral in position inside of the bay of the chassis.

Turning now to the drawings, FIG. 1 illustrates chassis 10 of a computer. The chassis has a bay, or recess, 12 for receiving a peripheral device, such as a floppy disc drive, a compact disk read only memory drive, or a hard disc drive. Bay 12 has a configuration and construction suitable for seating peripheral 14. The chassis 10 forms a bottom side of the bay which supports peripheral 14 and the chassis 10 also forms the lateral sides 13 of the bay 12 for holding the lateral sides 15 of peripheral 14 firmly in place after the peripheral 14 has been positioned inside of the bay 12.

To firmly hold peripheral 14 in bay 12, bowed elastic portion 22, made of a thin metal strip or other elastic material, of holder 20 is attached to each lateral side 15 of peripheral 14. One end of holder 20 forms bowed elastic portion 22 and the opposite end of brace device 20 forms handle 24. Thus, a user can slide peripheral 14, with mounted holders 20, into the bay 12. Once the peripheral device 14 is inserted into the bay 12, the peripheral 14 is held in place by force generated by the bowed elastic portion 22 of the holder 20. To disengage the peripheral 14 from the chassis 10 a user must firmly pull on handles 24 to remove the peripheral 14.

Figure 2:
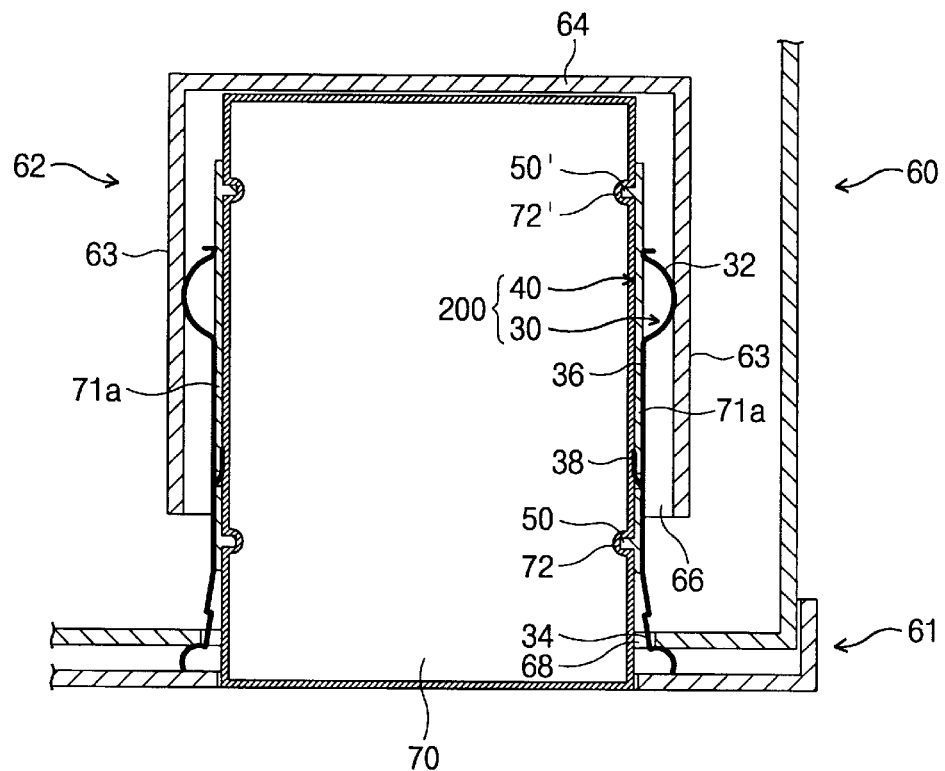
FIG. 2 is a cross-sectional plan view of a computer housing as constructed according to the principles of the present invention, showing a peripheral engaged with a brace device.

FIG. 2 illustrates pair of brace devices 200, as constructed according to the principles of the present invention, holding peripheral 70 inside a bay 62 in the chassis 60 of a computer housing. Brace device 200 may be constructed using first bracket 40 that slidably engages with second bracket 30. An elastic portion 32 is formed on one end of second bracket 30 of each brace device 200 to provide a compressive force that securely holds the peripheral 70 in position. Each brace device 200 is detachably mounted to each lateral side 71a of peripheral 70 and is used for removably holding peripheral 70 in bay 62 of the chassis. Bowed elastic portion 32 of second bracket 30 and first bracket 40 combine to exert force on both lateral side 63 of bay 62 and on the peripheral 70. Bay 62 has a configuration and construction suitable for seating a host of peripheral devices, such as a compact disk read only memory drive, a floppy disk drive, a hard disk drive, a zip drive, a digital video disk drive, a modem, or any other peripheral designed to be mounted in a bay in a computer housing.

Figure 3:
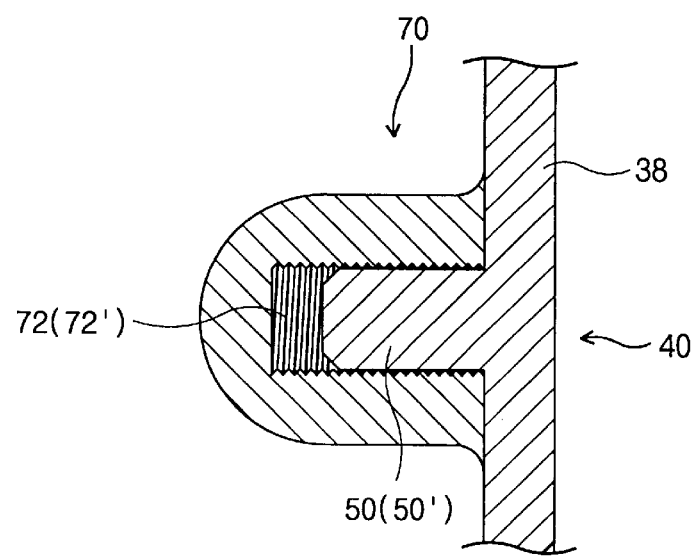
FIG. 3 is a cross-sectional view showing a plug, that is formed on the first bracket of the brace device of FIG. 2, that is fitted inside of a hollow formed in each side wall of the peripheral.

FIG. 3 is a cross-sectional view of the plug of FIG. 2. Plug 50 or 50' is attached to the first bracket 40 of the brace device 200 of FIG. 2 to physically engage peripheral 70. Plug 50 is attached to first bracket 40 of the brace device and is insertable into hollow 72 in a lateral side 71a of peripheral 70. As shown in both FIGS. 2 and 3, plugs 50 and 50' of first bracket 40 are insertable into hollows 72 and 72' in each lateral side 71a of peripheral 70. Thus, plugs 50 and 50' allow a user to detachably mount first bracket 40 of the brace device to each lateral side 71a of peripheral 70. Most manufacturers of peripherals typically form a plurality of screw holes on each lateral side of the peripheral device to be used as hollows to receive screws. It is these hollows into which the plugs of the current invention will fit to secure the peripheral device.

Figure 4:
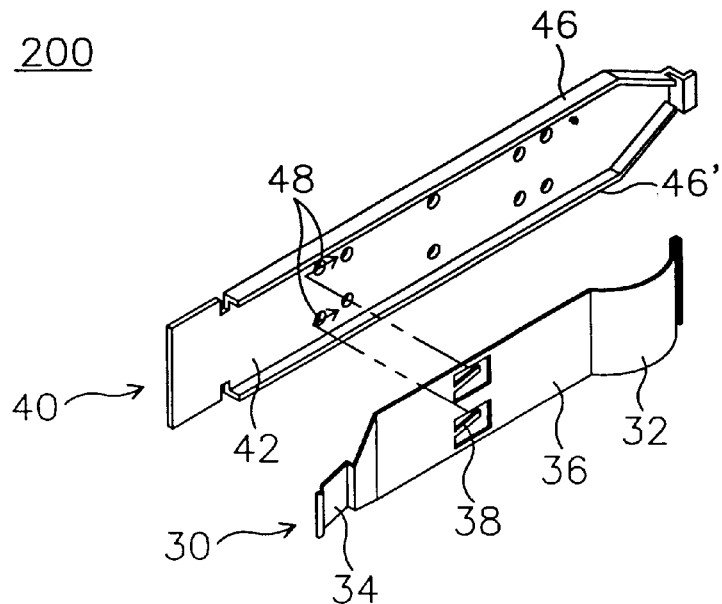
FIG. 4 is an exploded perspective view of the first and second bracket, and the elastic portion of the second bracket, components of the brace device of FIG. 2.
Figure 5:
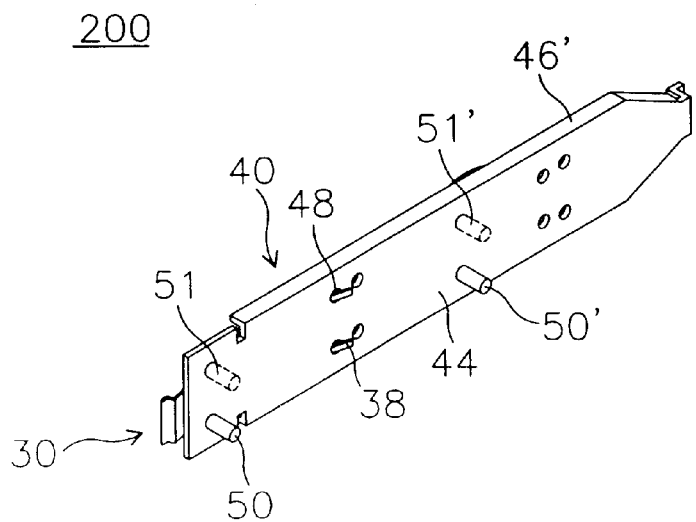
FIG. 5 is a perspective view of the brace device of FIG. 2 with a plurality of plugs specifically positioned for holding a 3.5" floppy disc drive in the bay in the computer chassis.

As shown in FIGS. 2, 4 and 5, brace device 200 is capable of elastically and removably holding peripheral 70 in bay 62. Brace device 200 is mounted to each lateral side 71a of peripheral 70. First bracket 40 of brace device 200 is engageable with a lateral side 71a of peripheral 70. When peripheral 70 is installed in bay 62, first bracket 40 slides on the bay's bottom side 66, and that supports peripheral 70.

To firmly hold peripheral 70 in bay 62, second bracket 30 exerts a force against both the lateral side 63 of the bay 62 and against first bracket 40. One end of second bracket 30 forms a bowed elastic portion 32 and a second end of second bracket 30 forms latch 34. The bowed elastic portion 32 of second bracket 30 is compressed by lateral sides 63 of bay 62 and latch 34 is brought into engagement with hole 68 in the chassis 61, thus firmly holding peripheral 70 in bay 62 without allowing peripheral 70 to unexpectedly move in the bay 62.

In the computer housing of this invention, peripheral 70 is installed in bay 62 of chassis 60 without using any separate fasteners, such as set screws. To install a peripheral in bay 62 without using fasteners, brace device 200 may be constructed using first bracket 40 and second bracket 30. As shown in FIG. 4, first bracket 40 has holes 48 that receive elastic prongs 38 of second bracket 30. Elastic prongs 38 are brought into engagement with holes 48 so that second bracket 30 and first bracket 40 can be assembled into brace device 200. When assembling the second bracket 30 with first bracket 40, bowed elastic portion 32 is seated on outside surface 42 of first bracket 40 with elastic prongs 38 being fitted into holes 48 of first bracket 40. After insertion of the elastic prongs 38 into holes 48, the prongs 38 project from inside surface 44 of first bracket 40.

As shown in FIGS. 2 and 3, each lateral side 71a of peripheral 70 has a multitude of hollows 72 and 72', while inside surface 44 of first bracket 40 has a multitude of plugs 50 and 50' at positions corresponding to hollows 72 and 72'. First bracket 40, with bowed elastic portion 30, is brought into engagement with a lateral side 71a of peripheral 70 by fitting projections 50 and 50' into slots 72 and 72'.

As described above, a plurality of fastener holes, typically formed on each lateral side of most peripherals produced by manufacturers, may be used as the hollows 72 and 72' that are depicted in the figures. Of course, it is possible to separately form the slots 72 and 72' after the peripheral has been produced, if a retrofit were desired. The bracing device of the present invention simplifies manufacturing of computer systems by simplifying the assembly of peripherals with computer systems. Plugs 50 and 50' may be constructed using rod-shaped members.

Figure 6:
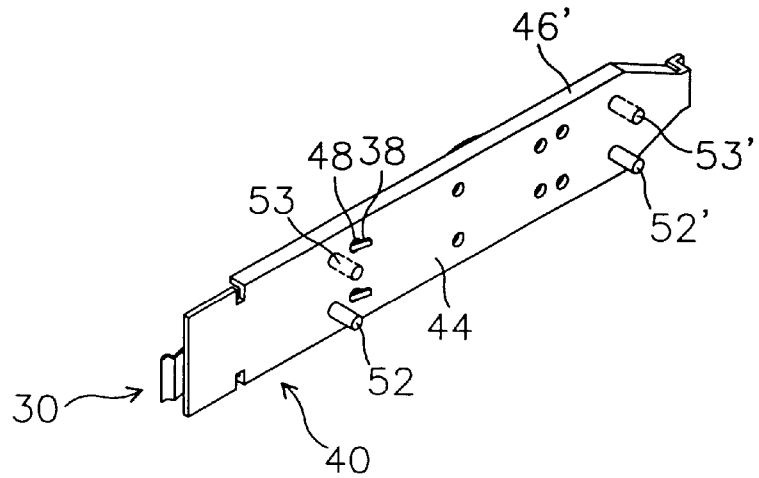
FIG. 6 is a perspective view of a brace device as constructed according to the principles of the second embodiment of the present invention with a multitude of plugs attached to the first bracket in a position for holding a CD-ROM drive in the bay of the chassis of the computer.
Figure 7:
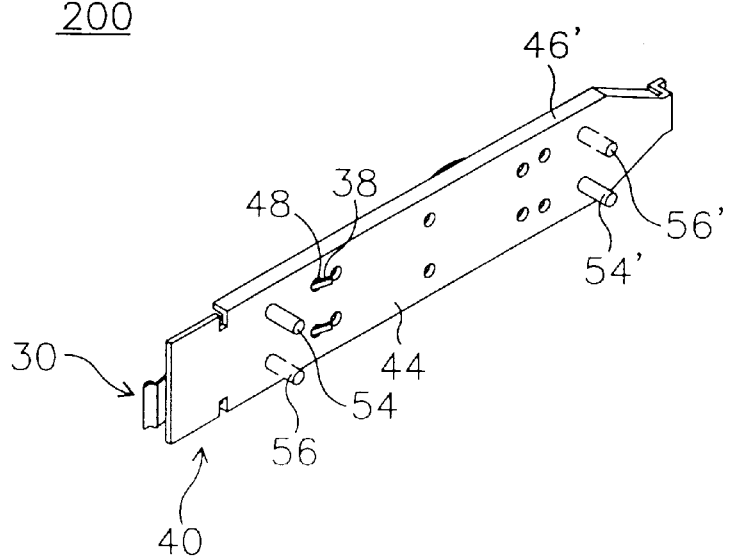
FIG. 7 is a perspective view of a brace device as constructed according to the principles of another embodiment of the present invention with a multitude of plugs positioned at diagonally opposite positions on the brace device.

FIGS. 5 through 7 show brace devices with plugs in different positions depending on the configuration of the hollows in the peripheral that a user wishes to mount. FIG. 5 illustrates a brace device with plugs 50 and 50'specifically positioned for holding a 3.5" floppy disc drive in the bay of the computer chassis. FIG. 6 shows a brace device with plugs 52 and 52' positioned to engage a compact disk read only memory drive. Plugs 50, 50', 52 and 52' are fitted into the screw holes that manufacturers typically form on each lateral side of peripheral devices. It is also possible to provide plugs 51, 51', 53 and 53' instead of plugs 50, 50', 52 and 52' on the brace device, as shown in FIGS. 5 and 6.

FIG. 7 is a perspective view of brace device 200 with plugs positioned to hold a different peripheral device than that of the above mentioned figures. Plugs 54 and 54', 56 and 56' are provided on inside surface 44 of first bracket 40 at diagonally opposite positions, so that the projections more stably and firmly hold first bracket 40 on each lateral side of peripheral 70, relative to the plug configuration shown in FIGS. 5 and 6.

Figure 8:
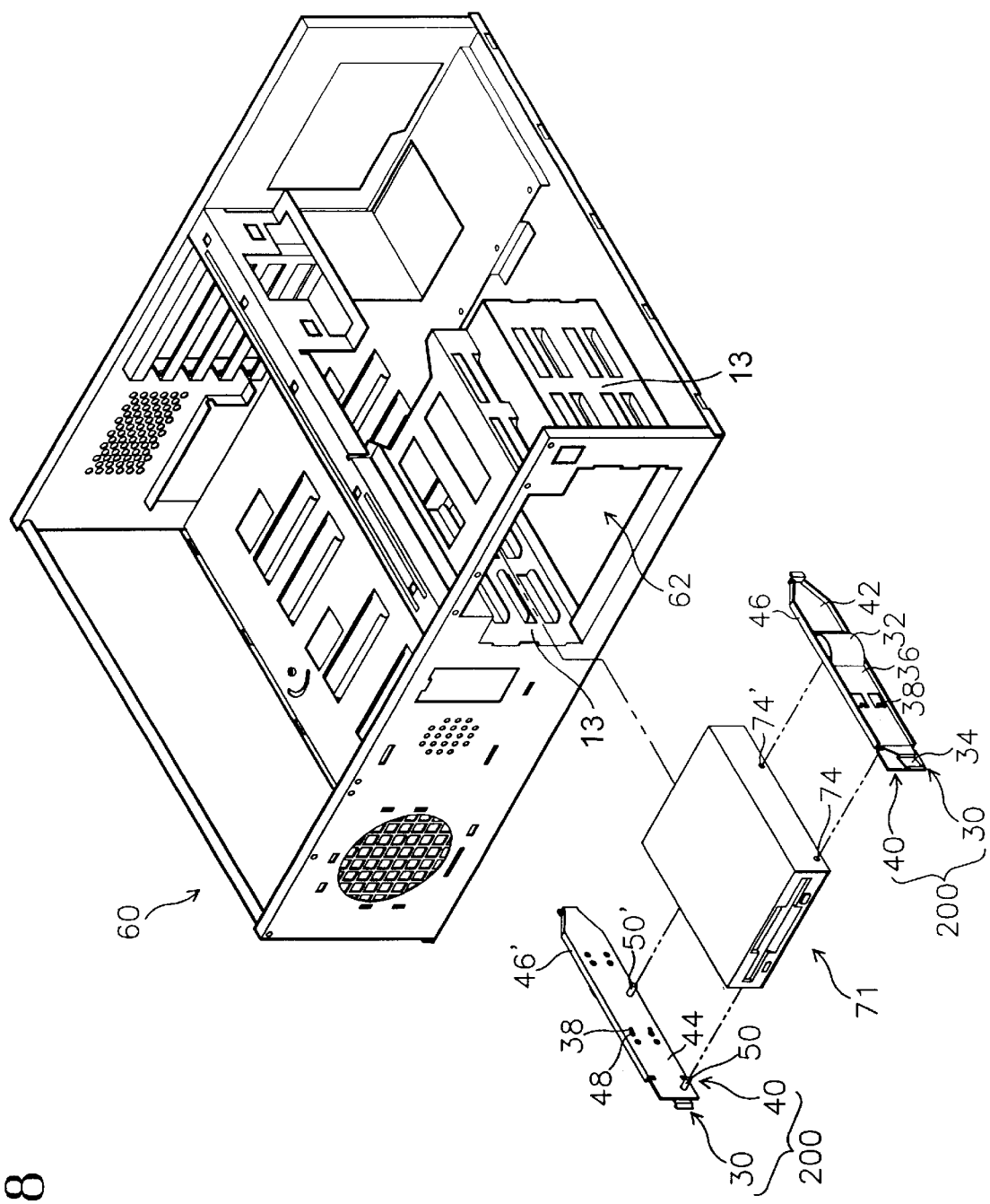
FIG. 8 is an exploded perspective view of the brace device of the present invention designed for holding a 3.5" floppy disk drive along with the chassis of a computer.
Figure 9:
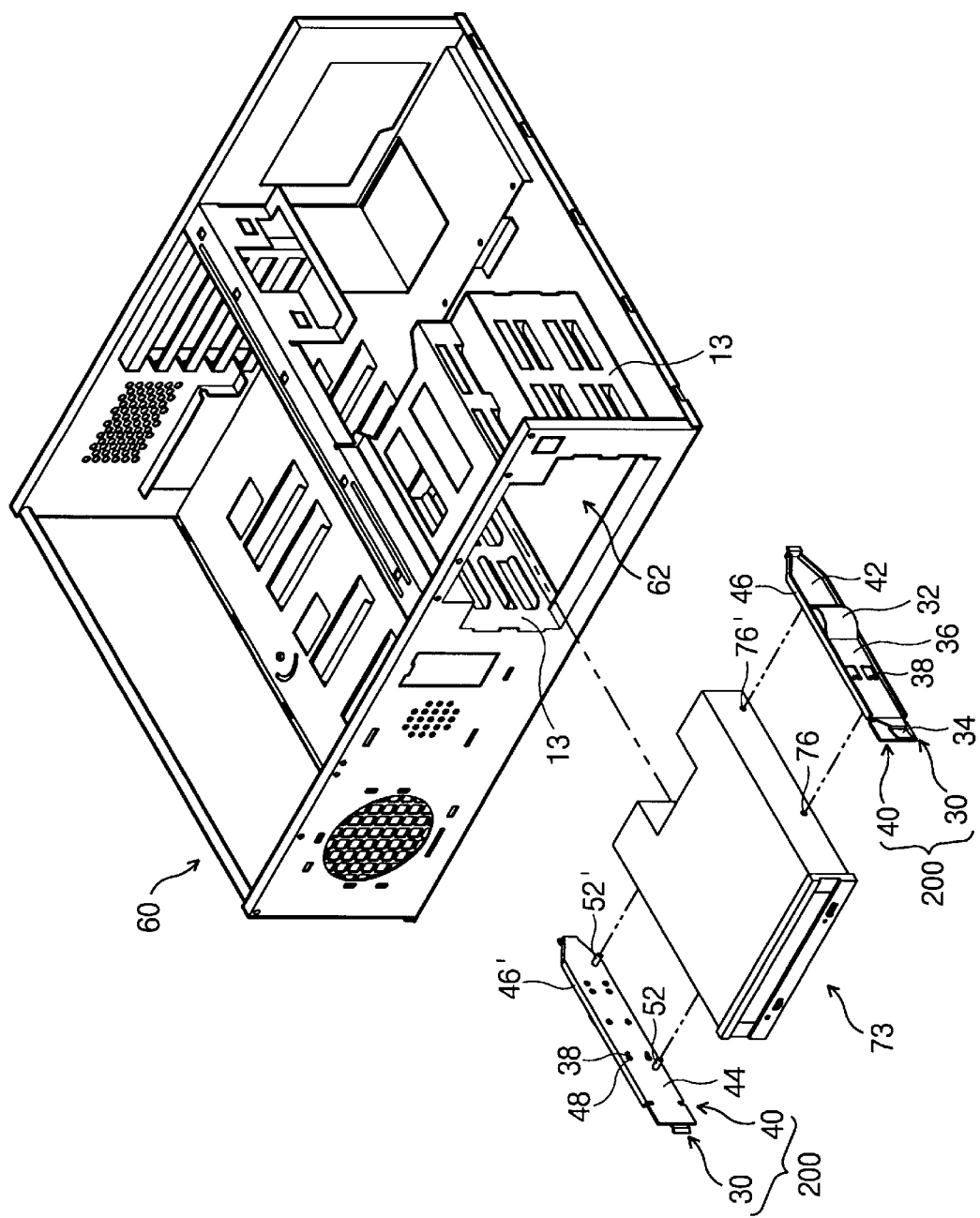
FIG. 9 is an exploded perspective view of the brace device of FIG. 6 and a compact disk read only memory drive that will be mounted in a computer chassis.

FIG. 8 shows a schematic view of the pair of brace devices 200 of FIG. 5 along with 3.5" floppy disc drive 71 that will be mounted in the bay 62 of the computer chassis 60. FIG. 9 shows a schematic view of the pair of brace devices 200 of FIG. 6 along with compact disk read only memory drive 73 that will be mounted in the bay of the computer chassis.

To install a 3.5" floppy disc drive 71 in bay 62 of chassis 60 using the brace device of the present invention, bowed elastic portion 30 is brought into contact with first bracket 40. At the same time, elastic prongs 38 of second bracket 30 are inserted into holes 48 of first bracket 40, as shown in FIG. 4. Then, first bracket 40, along with second bracket 30, is mounted to each lateral side of 3.5" floppy disc drive 71. The engagement of first bracket 40 with each lateral side of floppy disk drive 71 is accomplished by fitting projections 50 and 50' of first bracket 40 into slots 74 and 74' of drive 71. After the bracing device 200 is engaged with peripheral 71, the drive 71 is fully inserted into bay 62 of chassis 60 until drive 71 is completely seated in bay 62, as shown in FIG. 2. The installation of compact disk read only memory drive 73 in bay 62 of the chassis using the brace devices of the present invention is performed using the same method described above for floppy disk drives 71. Plugs 52 and 52' (FIG. 9) of first bracket 40 are inserted into slots 76 and 76' of compact disk read only memory drive 73. The position of drive 73 after the drive has been installed in bay 62 is shown in FIG. 2.

When peripheral 70 (FIG. 2) is completely installed in bay 62 of chassis 60, first bracket 40 is supported by bottom side 66 of bay 62. In addition, bowed elastic portion 30 is elastically compressed by lateral sides 63 of bay 62, thus holding peripheral 70 in bay 62. Latch 34 of second bracket 30 is engaged with hole 68 in chassis 60. This firmly holds peripheral 70 in bay 62 while preventing peripheral 70 from unexpectedly being removed from bay 62. The front side of chassis 60, along with peripheral 70, is then covered with front cover 61. Peripheral 70 is easily removed from bay 62 of chassis 60 by reversing the above steps.

The combination of the plugs of the first bracket and the bowed elastic portion of the second bracket allows the brace device to be mounted to a lateral side of a peripheral without using any fasteners or separate fixing means, such as set screws.

Figure 10:
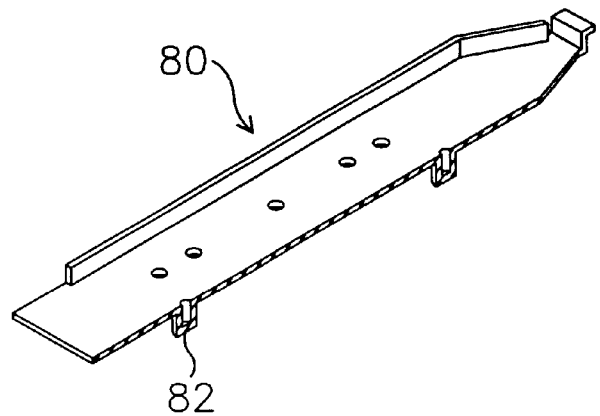
FIG. 10 is a partially cross-sectioned perspective view of a brace device that is integrally formed with plugs out of a single structure.
Figure 11:
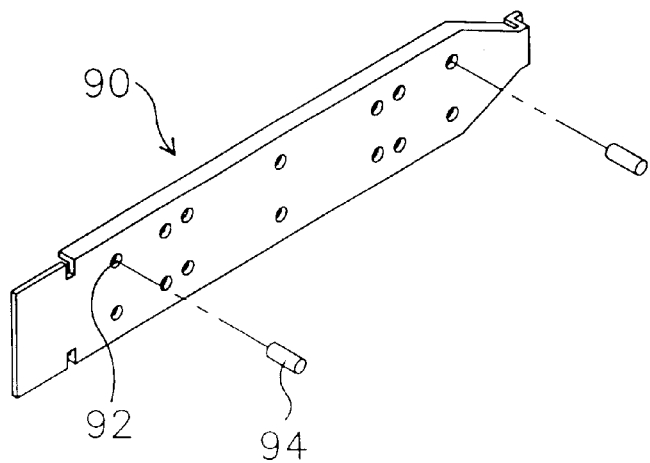
FIG. 11 is a perspective view of a brace device with plugs being positioned for welding to the brace device.

FIG. 10 shows first bracket 80 with plugs 82 integrally formed with the first bracket 80. First bracket 80, along with plugs 82, may be integrally formed out of a metal plate manufactured through a pressing process. Alternatively, first bracket 80, along with projections 82, may be manufactured using plastic through an injection molding process. FIG. 11 shows first bracket 90 with plugs 94 being positioned for welding to the first bracket 90. Holes 92 are formed on the metal first bracket 90 prior to welding plugs 94 into holes 92.

Figure 12:
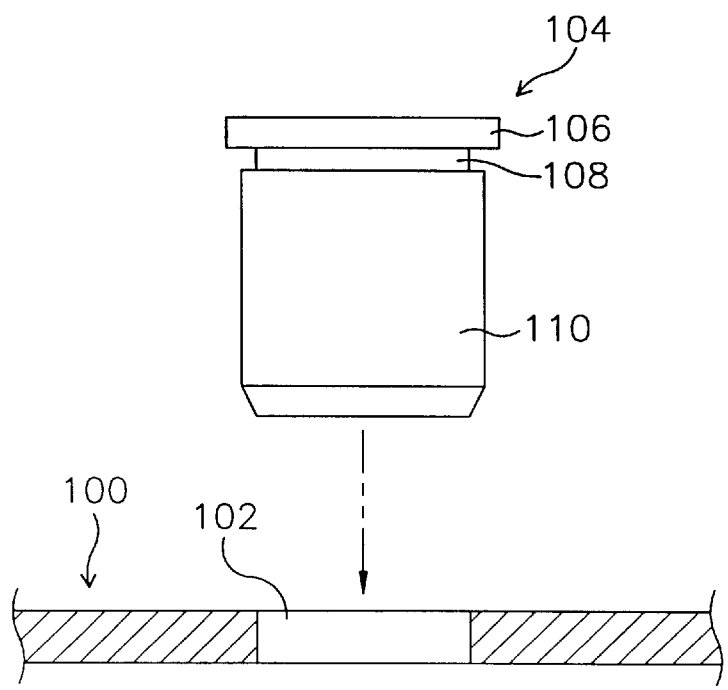
FIG. 12 is an exploded cross-sectional view of a brace device with a plug being mounted to the brace device through a fastening process.
Figure 13:
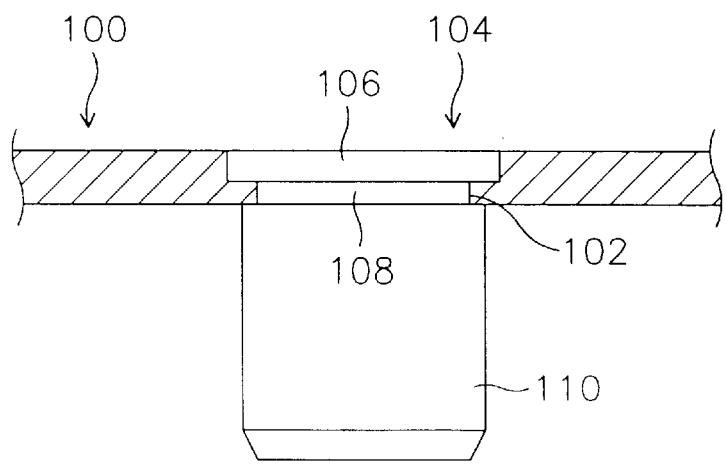
FIG. 13 is a cross-sectional view of the brace device of FIG. 12 with the plug completely inserted into the brace device.

FIG. 12 shows first bracket 100 with plug 104 being mounted to first bracket 100 through a fitting or insertion process. Hole 102 is formed on first bracket 100 prior to forcibly mounting plug 104 into hole 102. Plug 104 may be construct using a single one piece body or a body having the following three parts: head 106, annular fitting groove 108 and fitting shank 110. Head 106 of plug 104 has a larger diameter than that of hole 102, while the groove 108 has a smaller width or thickness than the thickness of first bracket 100. Shank 110 projects from the inside surface of first bracket 100 and is fitted into a hollow in the peripheral device. FIG. 13 shows first bracket 100 with plug 104 completely inserted into hole 102 of the first bracket 100.

Figure 14:
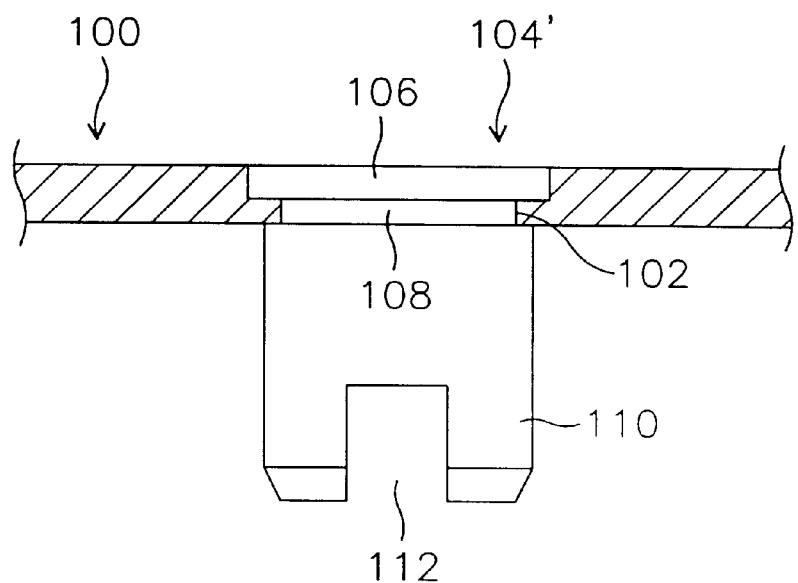
FIG. 14 is a cross-sectional view of a brace device having a plug, mounted via a fastening or fitting process, that has a slot on a distal end that protrudes into the bay of the chassis.

FIG. 14 shows first bracket 100, along with plug 104' mounted to the first bracket 100 through a fitting process. Slot 112 is positioned on a distal end of shank 110 to more firmly maintain the position of plug 100 in a peripheral device. Slot 112 almost completely prevents first bracket 100 from being unexpectedly removed from a peripheral device. It should be understood that slot 112 is compatible with any of the plugs mentioned with regard to this invention.

As described above, the present invention provides a computer housing capable of easily seating an auxiliary peripheral, such as a floppy disc drive, a CD-ROM drive and a hard disc drive, in the bay of a chassis without using any separate fixing means, such as set screws. The invention thus reduces the manufacturing costs of computer housings and simplifies the process of assembling or disassembling the computer housings. The system also has a simple construction, that makes it more difficult to have a problem that is hard to analyze and repair.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. For example, it should be understood that the word "peripheral" as used in both the specification and the claims should be interpreted to mean "any one of a cd-rom drive, a hard disk drive, a floppy disk drive, a modem, a digital video disk drive, a zip drive, and any peripheral that is typically mountable in a bay in a computer chassis". It is also possible that other benefits or uses of the currently disclosed invention will become apparent over time.

What is claimed is:

1. A computer housing, comprising:
    a body enclosing a chassis having a bay for receiving a peripheral device; and
    a brace device attachable to said chassis along a lateral side of said bay, said brace device being elastically biased inward from said lateral side of said bay and having a plurality of plugs protruding inward from said brace device;
    said peripheral device being slidably insertable into said bay and engageable with said chassis both by inserting said plugs of said brace device into said peripheral device and by a compressive force exerted on said peripheral device by said brace device, said plugs having a slot in a distal end thereof for engaging said perpheral device.

2. The computer housing of claim 1, said brace device further comprising:
    a first bracket; and
    a second bracket slidably engageable with said first bracket, said second bracket having a bowed elastic portion for generating said compressive force.

3. The computer housing of claim 2, said brace device being inserted into a slot in said lateral side of said bay with said second bracket being interposed between said lateral side of said bay and said first bracket, said bowed elastic portion pressing against both said first bracket and said lateral side of said bay.

4. The computer housing of claim 2, said brace device having a latch on an end for manually compressing said bowed elastic portion to release said peripheral device from said bay.

5. The computer housing of claim 2, said bracket device further comprising a plurality of bores in said first bracket for holding said plugs, said plugs being removably inserted into some of said bores depending on a configuration of said peripheral device.

6. The computer housing of claim 2, said bracket device further comprising a plurality of bores in said first bracket for holding said plugs, said plugs being welded into some of said bores depending on a configuration of said peripheral device.

7. The computer housing of claim 2, said bracket device further comprising a plurality of threaded bores in said first brackets said plugs having a circular cross section and being fastenably inserted into said threaded bores.

8. The computer housing of claim 2, said first bracket and said plugs being integrally formed.

9. A computer housing, comprising:
    a body enclosing a chassis having a bay for receiving a peripheral device; and
    a brace device attachable to said chassis along a lateral side of said bay, said brace device being elastically biased inward from said lateral side of said bay and having a plurality of plugs rigidly borne by said brace device independently of any engagement between said brace device and the peripheral device, said brace device comprising a first bracket and a second bracket slidably engageable with said first bracket, said second bracket having an elastic portion for generating a compressive force;
    said peripheral device with said brace device being slidably inserted into said bay and engageable with said chassis by insertion of said brace device into the peripheral device.

10. The computer housing of claim 9, said brace device being inserted into a slot in said lateral side of said bay with said second bracket being interposed between said lateral side of said bay and said first bracket, said elastic portion pressing against both said first bracket and said lateral side of said bay.

11. The computer housing of claim 9, said second bracket having a bowed elastic portion on and end thereof and a latch on another end thereof, said bowed elastic portion being compressed by the lateral side of said bay and said latch being engaged with said chassis to hold said peripheral device in said chassis.

12. The computer housing of claim 9, said plugs having a slot in a distal end thereof for engaging said peripheral device.

13. The computer housing of claim 9, said brace device further comprising a plurality of bores in said first bracket for holding said plugs, said plugs being removably inserted into some of said bores depending on a configuration of said peripheral device.

14. The computer housing of claim 9, said brace device further comprising a plurality of bores in said first bracket for holding said plugs, said plugs being welded into some of said bores depending on a configuration of said peripheral device.

15. The computer housing of claim 9, said brace device further comprising a plurality of threaded bores in said first bracket, said plugs having a circular cross section and being fastenably inserted into said threaded bores.

16. The computer housing of claim 9, wherein one of said brace devices is disposed on each said lateral side of said bay.

17. A computer housing, comprising:
   a body enclosing a chassis having a bay for interfacing with a perpiheral device; and
   two brace devices, each attachable to said chassis along a lateral side of a bay, each of said two brace devices being elastically biased inward from said of said bay, each of said two brace devices having a plurality of plugs protruding into said bay, and each of said two comprising first bracket and a second bracket slidably engageable with said first bracket, said second bracket having an elastic portion for generating a compressive force;
   said peripheral device being slidably insertable into said bay and engageable with said chassis both by inserting said plugs of said two brace devices into said peripheral device and by said compressive force exerted on said peripheral device by said two brace devices, said plugs having a slot in a distal end thereof for engaging said peripheral device.

18. The computer housing of claim 17 said two brace devices each being inserted into a slot in a respective lateral side of said bay with said second bracket being interposed between said respective lateral side of said bay and said first bracket, said elastic portion pressing against both said first bracket and said respective lateral side of said bay.

19. The computer housing of claim 17, said two brace devices each having a bowed elastic portion on and end thereof and a latch on another end thereof, said bowed elastic portion being compressed by the lateral side of said bay and said latch being engaged with said chassis to hold said peripheral device in said chassis.

* * * * *